US011109532B2

(12) United States Patent
Kuriyagawa et al.

(10) Patent No.: US 11,109,532 B2
(45) Date of Patent: Sep. 7, 2021

(54) LAWN MOWER WITH SPEED CONTROLLED SHUTTER DEVICE

(71) Applicant: HONDA MOTOR CO., LTD., Tokyo (JP)

(72) Inventors: Koji Kuriyagawa, Wako (JP); Hajime Yoshimura, Wako (JP); Shota Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 16/472,089

(22) PCT Filed: Dec. 12, 2017

(86) PCT No.: PCT/JP2017/044604
§ 371 (c)(1),
(2) Date: Jun. 20, 2019

(87) PCT Pub. No.: WO2018/123569
PCT Pub. Date: Jul. 5, 2018

(65) Prior Publication Data
US 2019/0380271 A1 Dec. 19, 2019

(30) Foreign Application Priority Data
Dec. 26, 2016 (JP) .............................. JP2016-252030

(51) Int. Cl.
*A01D 43/063* (2006.01)
*A01D 34/412* (2006.01)
*A01D 101/00* (2006.01)

(52) U.S. Cl.
CPC ....... *A01D 43/0631* (2013.01); *A01D 34/412* (2013.01); *A01D 2101/00* (2013.01)

(58) Field of Classification Search
CPC ...... A01D 34/63; A01D 34/412; A01D 34/64; A01D 34/66; A01D 43/0631; A01D 43/063; A01D 2101/00
(Continued)

(56) References Cited

U.S. PATENT DOCUMENTS 5,605,033 A * 2/1997 Olmr ................... A01D 43/0631
56/10.2 R
7,814,739 B2 * 10/2010 Uemura ............... A01D 42/005
56/320.2
(Continued)

FOREIGN PATENT DOCUMENTS

JP  2014-060936  4/2014

*Primary Examiner* — Alicia Torres
*Assistant Examiner* — Matthew Ian Neal
(74) *Attorney, Agent, or Firm* — Rankin, Hill & Clark LLP

(57) ABSTRACT

Uneven distribution of grass clippings in a grass clippings receptacle of a lawn mower can be minimized. A lawn mower includes: a work unit including a housing having a downward-facing opening and a cutter blade rotatably provided in the housing such that the cutter blade cuts grass and generates a transport air flow flowing from the opening of the housing to inside; a grass clippings receptacle configured to receive mowed grass clippings; a grass clippings transport passage connecting an interior of the housing with the grass clippings receptacle; a shutter device including a shutter configured to open and close the grass clippings transport passage and an actuator configured to open/close-drive the shutter; a controller configured to control the shutter device; and a speed sensor for detecting a travel speed of the lawn mower, wherein the controller is configured to open/close-control the shutter device based on the travel speed.

14 Claims, 8 Drawing Sheets

(58) Field of Classification Search
USPC ..................................................... 56/10.2 B
See application file for complete search history.

(56) References Cited

U.S. PATENT DOCUMENTS

| | | | | |
|---|---|---|---|---|
| 9,066,469 | B2* | 6/2015 | Kimura | ................ A01D 42/005 |
| 2006/0277886 | A1* | 12/2006 | Benway | ............. A01D 43/0631 |
| | | | | 56/203 |
| 2009/0188226 | A1* | 7/2009 | Carlson | ................ A01D 34/64 |
| | | | | 56/10.2 R |
| 2015/0068182 | A1* | 3/2015 | Decoster | ........... A01D 43/0631 |
| | | | | 56/202 |
| 2016/0309649 | A1* | 10/2016 | Shoji | ...................... A01D 34/71 |
| 2018/0177128 | A1* | 6/2018 | Kuriyagawa | .......... A01D 34/64 |

\* cited by examiner

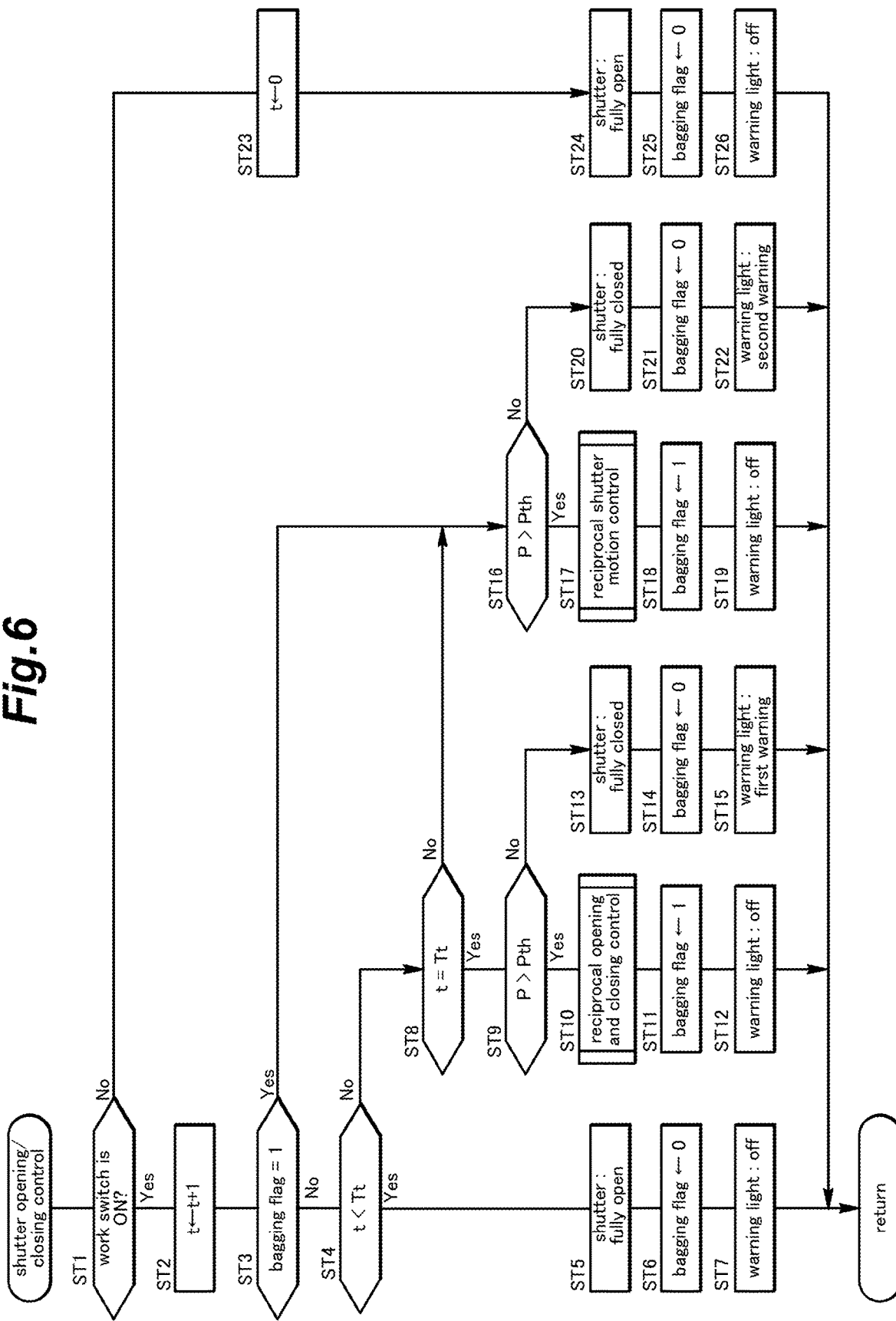

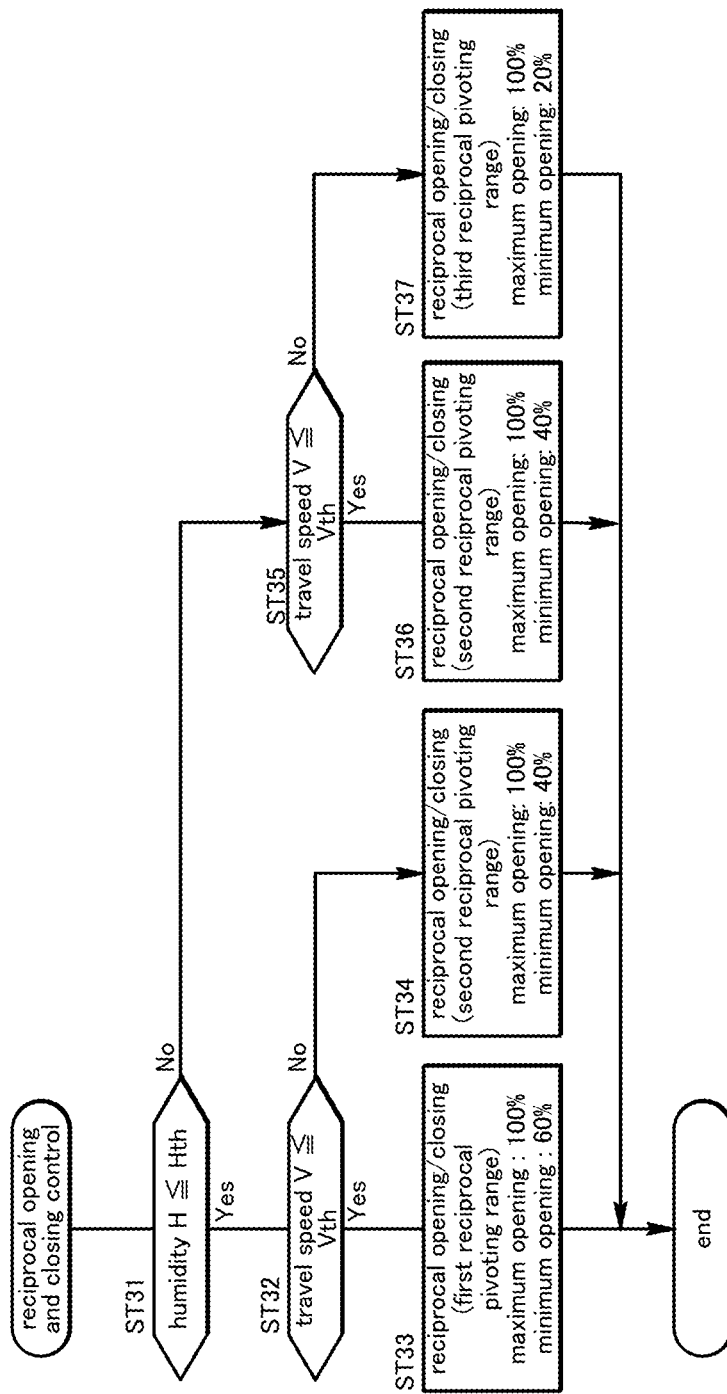

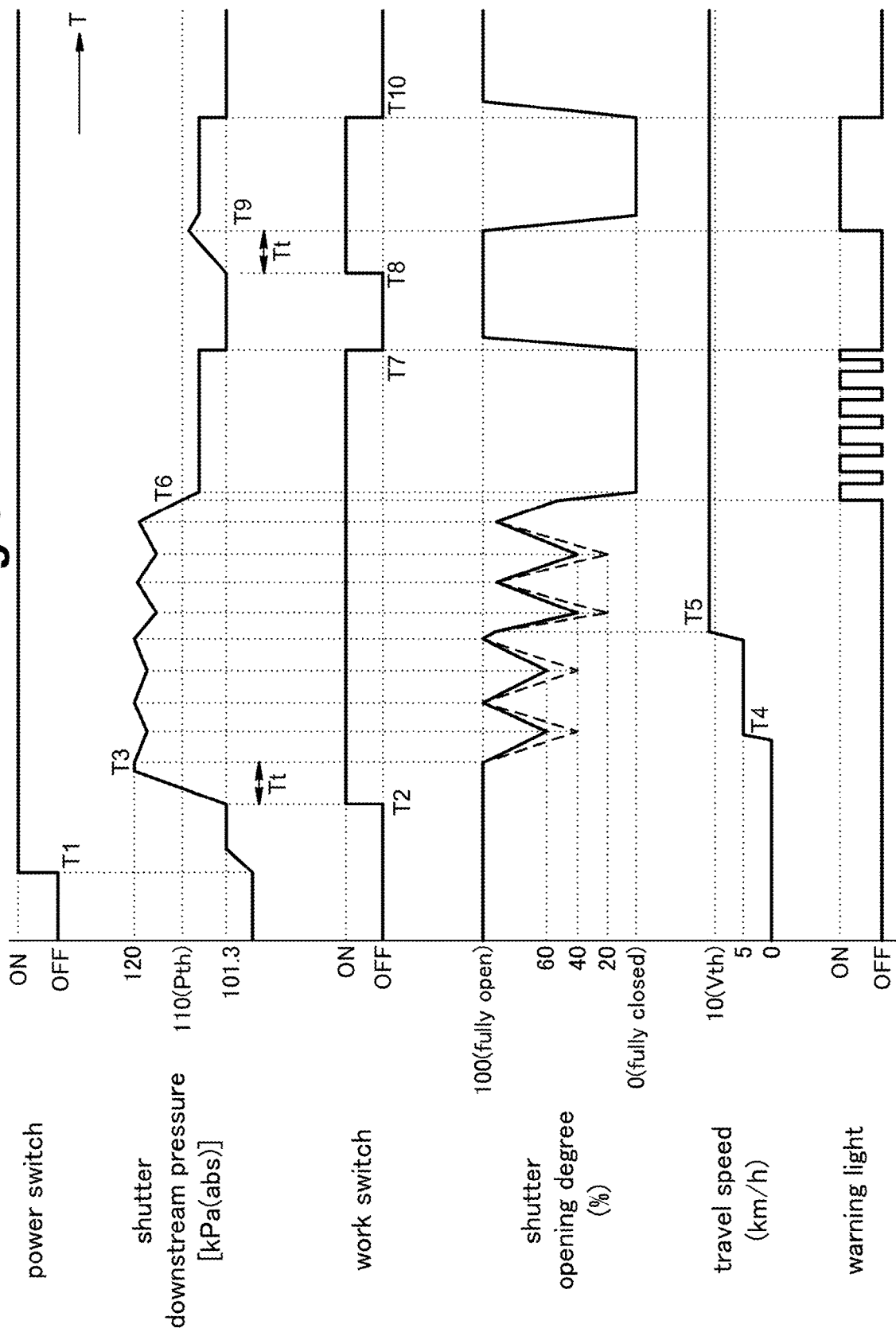

LAWN MOWER WITH SPEED CONTROLLED SHUTTER DEVICE

TECHNICAL FIELD

The present invention relates to a lawn mower.

BACKGROUND ART

Some lawn mowers are configured to contain: a work unit including a housing provided in a lower part of a main body to have a downward-facing opening and a cutter blade rotatably provided in the housing; a grass clippings receptacle for receiving mowed grass clippings; a grass clippings transport passage connecting an interior of the housing with the grass clippings receptacle; and a shutter provided in the grass clippings transport passage so as to be manually opened and closed (see Patent Document 1, for example). When rotated, the cutter blade cuts the grass and generates a transport air flow flowing from the opening of the housing to inside. When the shutter is open, the grass clippings are carried by the transport air flow through the grass clippings transport passage and collected in the grass clippings receptacle (bagging mode), and when the shutter is closed, the grass clippings are discharged onto the ground from the opening of the housing (mulching mode).

PRIOR ART DOCUMENT(S)

Patent Document(s)

Patent Document 1: JP2014-60936A

SUMMARY OF THE INVENTION

Task to be Accomplished by the Invention

In such a lawn mower, when the mowing conditions such as the rotational speed of the cutter blade, the amount of the grass clippings and the condition of the lawn are fixed, the flying distance (reaching distance) of the grass clippings in the grass clippings receptacle is uniform so that the grass clippings tend to be unevenly distributed in the grass clippings receptacle. Also, when the travel speed of the lawn mower increases while the rotational speed of the cutter blade is fixed, the resulting increase in the mowed grass clippings causes the flying distance of the grass clippings to be decreased so that the grass clippings tend to be preferentially deposited in a part of the grass clippings receptacle adjacent to the grass clippings transport passage.

In view of such a problem of the prior art, a primary object of the present invention is to provide a lawn mower that can minimize uneven distribution of grass clippings in the grass clippings receptacle.

To achieve such an object, the present invention provides a lawn mower, comprising: a work unit including a housing having a downward-facing opening and a cutter blade rotatably provided in the housing such that when rotated, the cutter blade cuts grass and generates a transport air flow flowing from the opening of the housing to inside; a grass clippings receptacle configured to receive mowed grass clippings; a grass clippings transport passage connecting an interior of the housing with the grass clippings receptacle; a shutter device including a shutter configured to open and close the grass clippings transport passage and an actuator configured to open/close-drive the shutter; a controller configured to control the shutter device; and a speed sensor for detecting a travel speed of the lawn mower, wherein the controller is configured to open/close-control the shutter device based on the travel speed.

According to this arrangement, since the opening degree of the shutter changes in dependence on the travel speed, the flow velocity of the transport air flow in the grass clippings transport passage varies so that the flying distance of the mowed grass clippings is varied. Thereby, an uneven distribution of grass clippings in the grass clippings receptacle is minimized.

In the above arrangement, preferably, the controller is configured to perform a reciprocal opening and closing control to open/close-control the shutter device such that the shutter successively repeats opening and closing within a predetermined reciprocal opening degree range, the reciprocal opening degree range being varied in dependence on the travel speed.

According to this arrangement, the reciprocal motion of the shutter causes the flow velocity in the grass clippings transport passage to vary, to thereby vary the flying distance of the grass clippings in the grass clippings receptacle and prevent uneven distribution of the grass clippings in the grass clippings receptacle. The reciprocal motion of the shutter also helps the grass clippings that have adhered to the shutter to drop from the shutter, and thereby contributes to preventing clogging of the grass clippings transport passage at a part near the shutter.

In the above arrangement, preferably, the controller is configured to set a minimum opening degree of the reciprocal opening degree range such that the minimum opening degree gets smaller with an increase in the travel speed.

According to this arrangement, uneven distribution of grass clippings in the grass clippings receptacle can be minimized. As the travel speed increases, the amount of grass contacting the cutter blade per unit time increases so that the amount of mowed grass clippings increases. When the rotational speed of the cutter blade is constant, the amount of air generated by the cutter blade is constant. Therefore, when the amount of the mowed grass clippings increases, the flying distance of the grass clippings in the grass clippings receptacle decreases, and the grass clippings tend to accumulate preferentially in the part of the grass clippings receptacle adjacent to the grass clippings transport passage. In this arrangement, when the travel speed is increased, the opening degree of the shutter is narrowed so that the flow velocity in the grass clippings transport passage increases. This in turn causes the flying distance of the grass clippings to increase so that the grass clippings are prevented from being preferentially deposited in the part of the grass clippings receptacle adjacent to the grass clippings transport passage.

In the above arrangement, preferably, the controller is configured to set a maximum opening degree of the reciprocal opening degree range such that the maximum opening degree is fixed without regard to the travel speed.

According to this arrangement, the reciprocal opening degree range increases with an increase in the travel speed so that the flying distance of the grass clippings becomes widely distributed. As a result, the preferential deposition of grass clippings in the grass clippings receptacle can be minimized even further.

In the above arrangement, preferably, the controller is configured to set the minimum opening degree of the reciprocal opening degree range to a prescribed first minimum opening degree when the travel speed is equal to or lower than a prescribed travel speed determination value, and set the minimum opening degree of the reciprocal opening degree range to a prescribed second minimum opening degree smaller than the first minimum opening degree when the travel speed is higher than the travel speed determination value.

According to this arrangement, when the travel speed is increased, the opening degree of the shutter is narrowed so that the flow velocity in the grass clippings transport passage is increased. This in turn causes the flying distance of the grass clipping to increase so that the grass clippings are prevented from being preferentially deposited in the part of the grass clippings receptacle adjacent to the grass clippings transport passage.

In the above arrangement, preferably, the lawn mower further comprises a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

According to this arrangement, the state of clogging of the grass clippings transport passage is determined from the pressure in the grass clippings transport passage detected by the pressure sensor, and the reciprocal opening and closing control is executed when the grass clippings transport passage is not clogged. In the transition period, the pressure increases with an increase in the rotational speed of the cutter blade. Therefore, by performing this determination process only after the elapsing of the transition period, an erroneous determination can be prevented.

In the above arrangement, preferably, the controller is configured to fully close the shutter in a case where the pressure is lower than or equal to the pressure determination value at a time after the transition period has elapsed.

According to this arrangement, the controller can control the shutter device based on a reduction of the pressure to prevent clogging of the grass clippings transport passage. When clogging occurs at a part of the grass clippings transport passage where the shutter is provided, the pressure in a part downstream of the shutter decreases. Therefore, it is possible to predict occurrence of clogging of the grass clippings transport passage based on a reduction of the pressure.

In the above arrangement, preferably, the controller is configured to control the shutter device so as to position the shutter at a fully open position when the work unit is stopped.

According to this arrangement, it is ensured that when driving of the work unit is started, the shutter is positioned at the fully open position, whereby the controller can control the shutter device based on the pressure in a state where the shutter is at the fully open position.

In the above arrangement, preferably, the lawn mower further comprises an operation input device configured to receive an operation input from an operator to operate driving and stopping of the work unit, wherein the controller is configured to detect start and stop of driving of the work unit based on a signal from the operation input device.

According to this arrangement, the controller is allowed to detect the start and stop of driving of the work unit easily and promptly.

Effect of the Invention

According to the above configuration, uneven distribution of grass clippings in a grass clippings receptacle of a lawn mower can be minimized.

BRIEF DESCRIPTION OF THE DRAWING(S)

FIG. 6 is a flowchart showing a procedure of shutter opening/closing control conducted by a controller;

FIG. 7 is a flowchart showing a procedure of reciprocal opening and closing control conducted by the controller; and FIG. 8 is a time chart showing operating states of various parts of the lawn mower.

MODES FOR CARRYING OUT THE INVENTION

A riding lawn mower according to an embodiment of the present invention will be described in the following.
(Structure of Lawn Mower)

Figure 1:
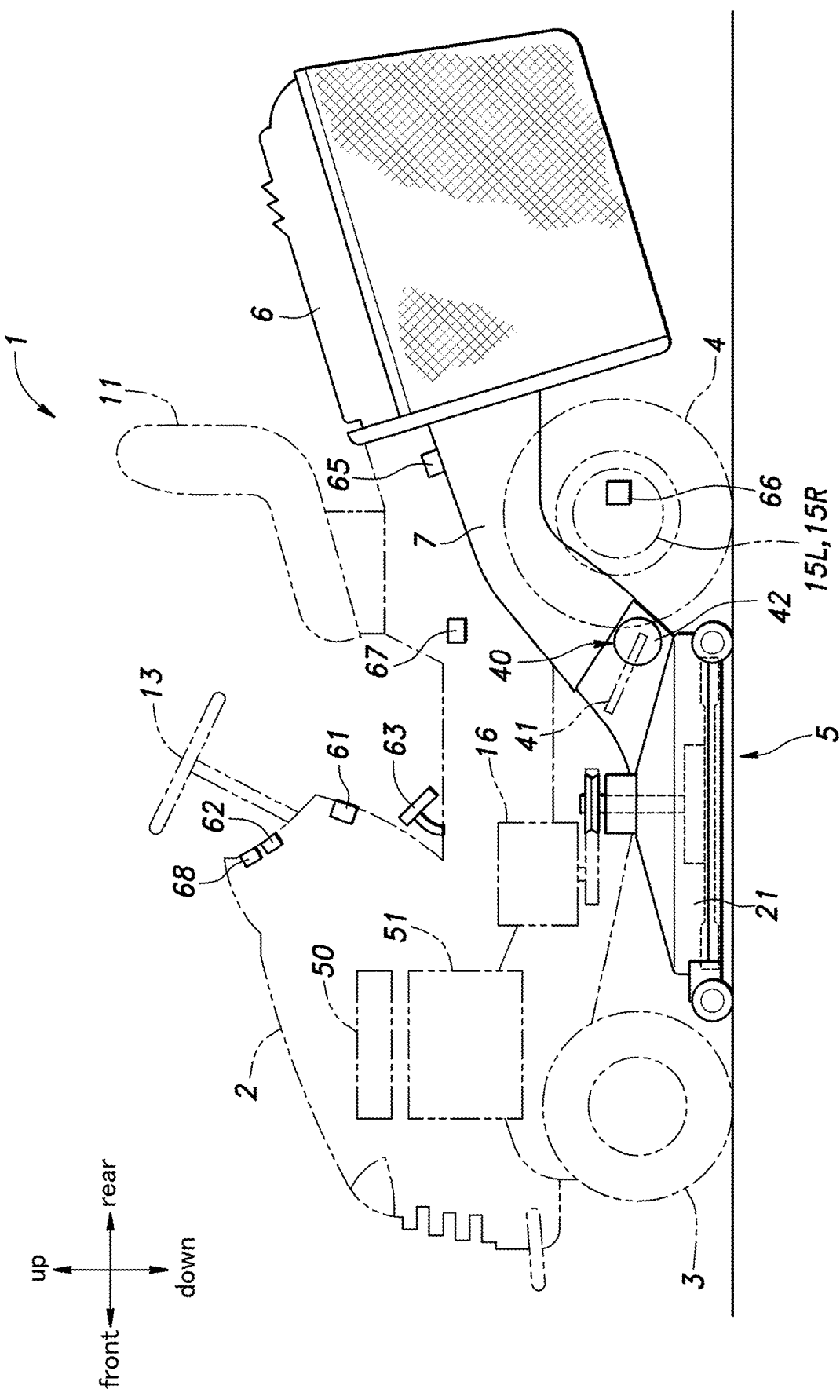
FIG. 1 is a schematic configuration diagram of a lawn mower according to an embodiment of the present invention.

As shown in FIG. 1, the lawn mower 1 of the present embodiment has a vehicle body 2 on which an operator can ride. A front lower part of the vehicle body 2 is provided with a pair of left and right front wheels 3, while a rear lower part of the vehicle body 2 is provided with a pair of left and right rear wheels 4. A work unit 5 is provided in a lower part of the vehicle body 2 at a central position in a fore and aft direction, and a grass clippings receptacle 6 (grass bag) is detachably supported at a rear end of the vehicle body 2. The vehicle body 2 is provided with a duct 7 (chute) extending from the work unit 5 to a rear side of the vehicle body 2, and the grass clippings receptacle 6 is connected to the rear end of the duct 7.

An upper part of the vehicle body 2 is provided with a seat 11 on which the operator can be seated. The front wheels 3 are supported by the vehicle body 2 via a steering device (not shown) so as to be steerable. A steering wheel 13, which is an operation input unit for the steering device, is arranged on an upper part of the vehicle body 2 to be located in front of the seat 11.

The vehicle body 2 is equipped with a drive source for driving the rear wheels 4 and a drive source for driving the work unit 5. These drive sources may be electric motors, internal combustion engines, or the like. The drive source for driving the rear wheels 4 and the drive source for driving the work unit 5 may be a common drive source. In the present embodiment, the mower 1 includes, as the drive sources, a left travel motor 15L for driving the left rear wheel 4, a right travel motor 15R for driving the right rear wheel 4, and a work motor 16 for driving the work unit 5.

Figure 2:
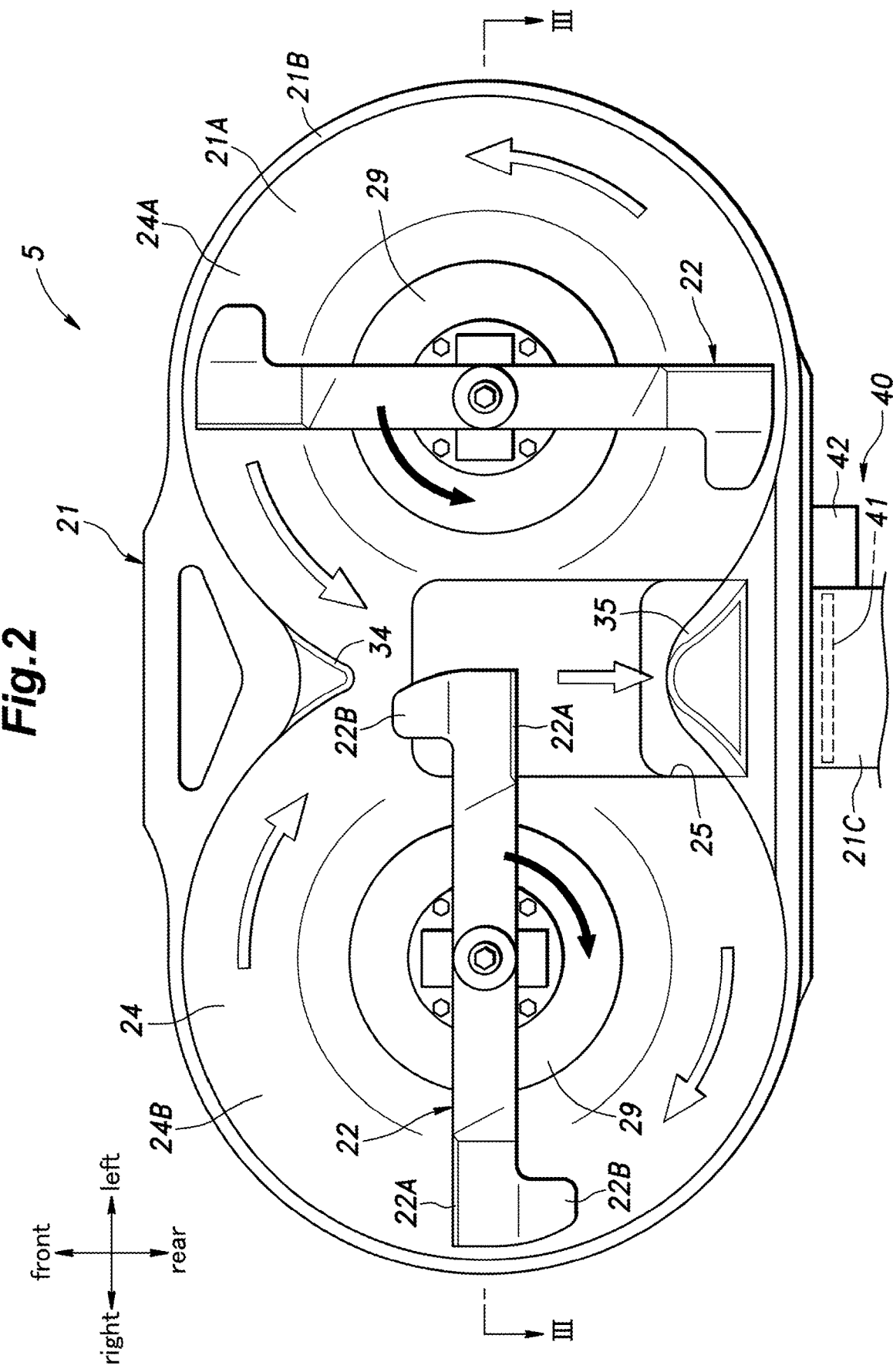
FIG. 2 is a bottom view of a work unit.
Figure 3:
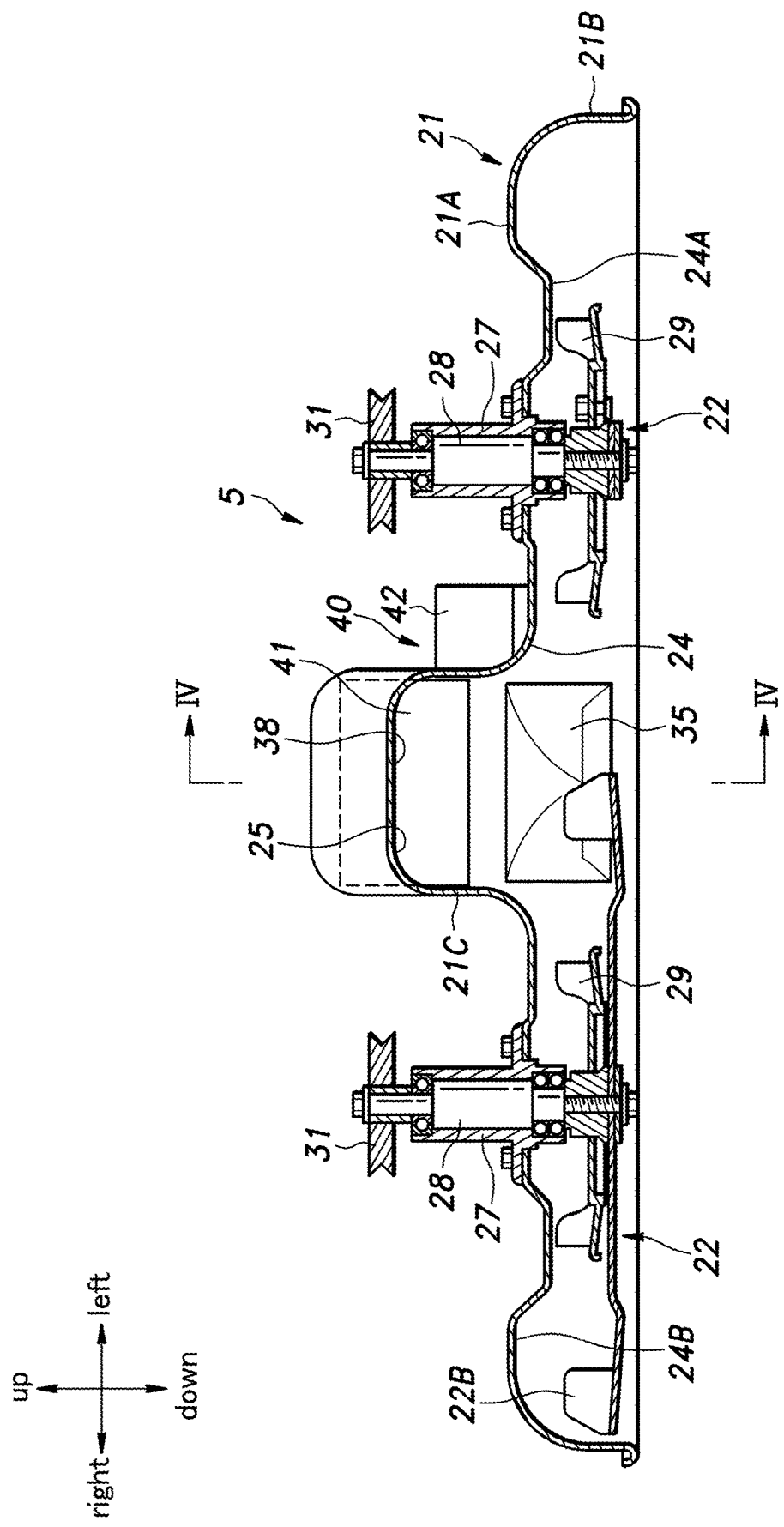
FIG. 3 is a vertical sectional view of the work unit (taken along line III-III in FIG. 2)
Figure 4:
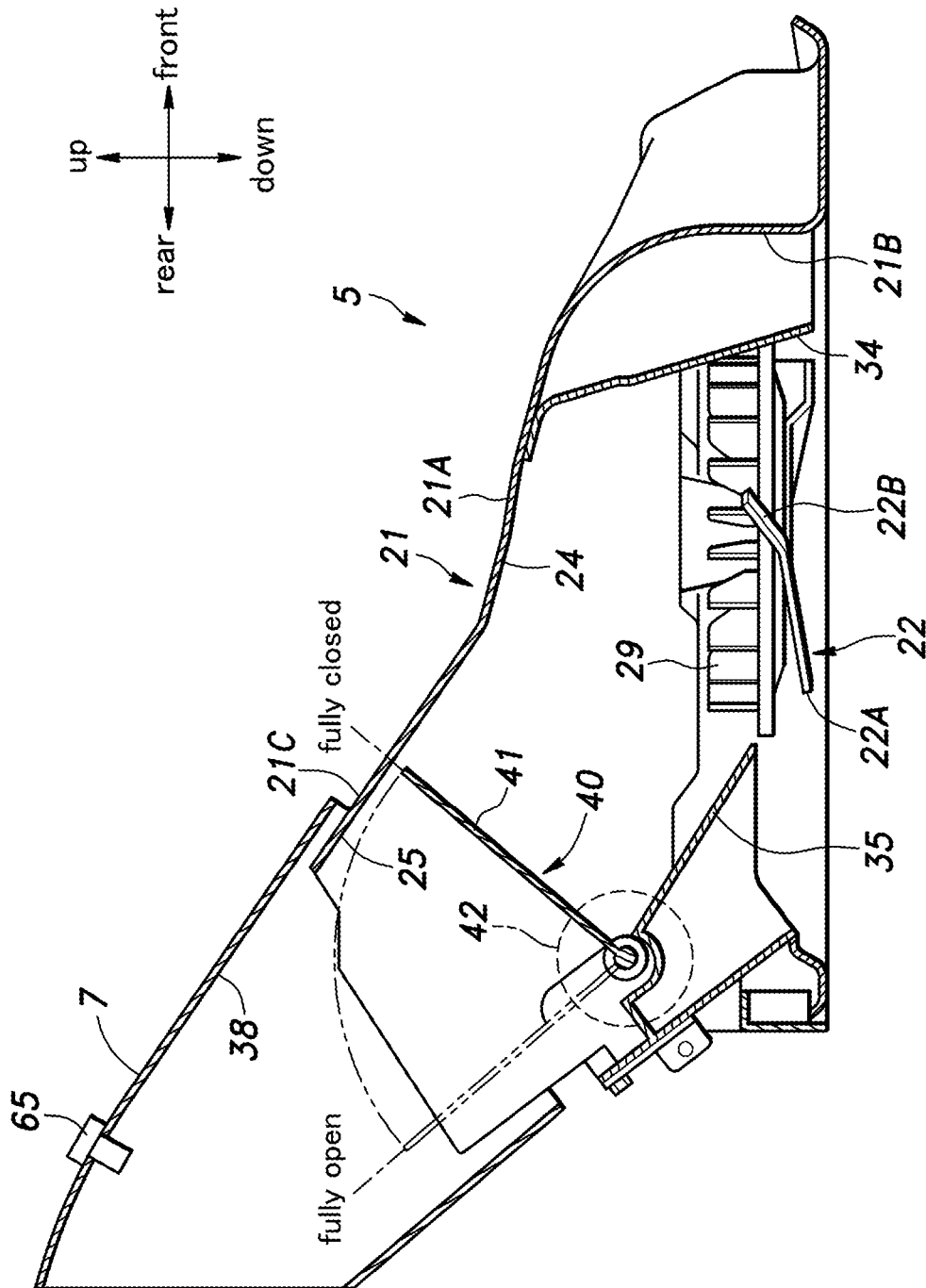
FIG. 4 is a vertical sectional view of the work unit (taken along line IV-IV in FIG. 3)

As shown in FIGS. 2 to 4, the work unit 5 includes a housing 21 opening downward and a pair of cutter blades 22 each rotatably provided in the housing 21. The housing 21 is supported in a lower part of the vehicle body 2 to face the ground. The housing 21 is laterally symmetrical in shape and extends laterally relative to the vehicle body 2. The housing 21 has an upper wall part 21A that extends laterally, a peripheral wall part 21B extending downward from and annularly along a periphery of the upper wall part 21A, and a passage part 21C extending rearward and upward from a central rear portion of the upper wall part 21A. The lower part of the housing 21 is provided with a recess 24 defined by the upper wall part 21A and the peripheral wall part 21B and having an opening facing downward. The recess 24 includes a recess left half 24A and a recess right half 24B which are laterally arranged next to each other. The recess left half 24A and the recess right half 24B are each formed to have a substantially circular shape as viewed from the bottom, and a right end of the recess left half 24A and a left end of the recess right half 24B are connected with each other. Thereby, the recess 24 defines a continuous space having a shape of two circles connected with each other as viewed from the bottom. The passage part 21C defines a connection passage 25 having a front end opening out in a lower surface of the upper wall part 21A to be in communication with the recess 24 and a rear end communicating with an outside of the housing 21.

A bearing member 27 is provided at each of a portion of the upper wall part 21A corresponding to the center of the recess left half 24A and a portion of the upper wall part 21A corresponding to the center of the recess right half 24B. The bearing member 27 is formed to have a tubular shape having a vertically extending axis, and is attached to the upper wall part 21A to extend therethrough. The bearing member 27 rotatably supports a rotary shaft 28 which vertically extends through the bearing member 27. The lower end of the rotary shaft 28 protrudes downward from the bearing member 27 to be positioned in the recess 24, and the upper end of the rotary shaft 28 protrudes upward from the bearing member 27 to be positioned above the upper wall. A cutter blade 22 and an auxiliary fan 29 are mounted on the lower end of the rotary shaft 28, and a driven pulley 31 is mounted on the upper end of the rotary shaft 28.

The cutter blade 22 consists of a linearly extending blade, and is attached to the lower end of the rotary shaft 28 at a central part thereof. Each end part of the cutter blade 22 is provided with a blade portion 22A on a front edge thereof with respect to the direction of rotation of the cutter blade 22 and an upward-bent vane portion 22B on a rear edge thereof. The vane portion 22B is configured to generate an upward swirling air flow when the cutter blade 22 rotates. The auxiliary fan 29 may consist of a per se known centrifugal fan, for example, and is provided immediately above the cutter blade 22 to be coaxial with the rotary shaft 28. Thus, a set of the cutter blade 22 and the auxiliary fan 29 is provided at the center of the corresponding one of the recess left half 24A and the recess right half 24B.

As shown in FIG. 1, the left and right driven pulleys 31 are connected with each other by a belt (not shown) together with a drive pulley (not shown) secured to a drive shaft of the work motor 16. The left and right driven pulleys 31, drive pulley, and belt constitute a power transmission mechanism (not shown) to transmit the power of the work motor 16 to each of the left and right rotary shafts 28. As shown in FIG. 2, the rotary shaft 28, the cutter blade 22, and the auxiliary fan 29 on the left side are configured to rotate counterclockwise as seen in the bottom view, while the rotary shaft 28, the cutter blade 22, and the auxiliary fan 29 on the right side are configured to rotate clockwise as seen in the bottom view. The left and right cutter blades 22 have a relative rotational phase difference of 90 degrees such that the blades 22 do not contact each other.

A portion of the peripheral wall forming a laterally central, front portion of the housing 21 is provided with a front guide wall 34 that protrudes rearward toward the center of the recess 24. The front guide wall 34 is formed to have a triangular shape protruding rearward as seen in the bottom view. A portion of the peripheral wall forming a laterally central, rear portion of the housing 21 is provided with a rear guide wall 35 that protrudes forward. The rear guide wall 35 defines a slanted surface that slants downward towards the front, and a rear end thereof is connected with a lower surface of the connection passage 25.

As shown in FIGS. 3 and 4, the rear end of the connection passage 25 is connected with the front end of the duct 7. The duct 7 extends from the front end thereof rearward and upward, and has a rear end positioned at the rear end of the vehicle body 2. The rear end of the duct 7 opens rearward. The grass clippings receptacle 6 is supported at the rear end of the vehicle body 2, and has a receptacle opening formed in a front upper part thereof and connected with the rear end of the duct 7. The connection passage 25 and the duct 7 jointly define a grass clippings transport passage 38 that connects an interior of the housing 21 of the work unit 5 and the grass clippings receptacle 6.

As shown in FIGS. 2 to 4, the connection passage 25 is provided with a shutter device 40 for opening and closing the connection passage 25. The shutter device 40 includes a shutter 41 and a shutter motor 42 (actuator) for driving the shutter 41. The shutter 41 is formed in a plate-like shape, and has a base end provided with a laterally extending pivot shaft pivotably supported inside the passage part 21C. The shutter 41 has a free end located generally above the base end, and is configured to be pivotable between a fully closed position (opening degree is 0%) where the main surface of the shutter 41 intersects the connection passage 25 substantially perpendicularly and a fully open position (opening degree is 100%) which the shutter 41 takes when rotated rearward from the fully closed position and where the main surface of the shutter plate 41 extends along the lower surface of the connection passage 25. The shutter motor 42 consists of an electric motor in the illustrated embodiment, and is fixedly attached on an outer side of the passage part 21C such that a rotational force of the shutter motor 42 is applied to the pivot shaft of the shutter 41. The shutter motor 42 and the rotary shaft 28 may be connected with each other via a reduction gear mechanism.

As shown in FIG. 2, when the pair of cutter blades 22 and the pair of auxiliary fans 29 are rotated, an upward transport air flow that swirls counterclockwise about the rotary shaft 28 as seen from the bottom is produced in the recess left half 24A, and an upward transport air flow that swirls clockwise about the rotary shaft 28 as seen from the bottom is produced in the recess right half 24B. The grass clippings cut by the cutter blades 22 are carried by the transport air flows to flow together with the transport air flows. The transport air flows in the recess left half 24A and the recess right half 24B are guided to flow rearward by the front guide wall 34 at the front central portion of the recess 24.

When the shutter 41 is partially or fully opened and not at the fully closed position, the transport air flow flowing rearward in the central portion of the recess 24 is guided to flow rearward and upward by the rear guide wall 35 into the connection passage 25. Then, the transport air flow and the grass clippings flow through the grass clippings transport passage 38 formed by the connection passage 25 and the duct 7 into the grass clippings receptacle 6, such that the grass clippings are collected in the grass clippings receptacle 6. An operation mode when the shutter 41 is positioned in any open position excluding the fully closed position and the grass clippings are carried by the transport air flow to the grass clippings receptacle 6 is referred to as a bagging mode.

On the other hand, when the shutter 41 is at the fully closed position, the transport air flow flowing rearward in the central portion of the recess 24 separates into air flows that flow into the recess left half 24A and the recess right half 24B, such that the separated air flows flow outward and downward from outer peripheral portions of the recess 24 while swirling. The grass clippings also flow outward of the recess 24 along with the transport air flow, and are discharged onto the ground. An operation mode when the shutter 41 is at the fully closed position and the grass clippings are discharged from the recess 24 onto the ground is referred to as a mulching mode.

(Controller)

Figure 5:
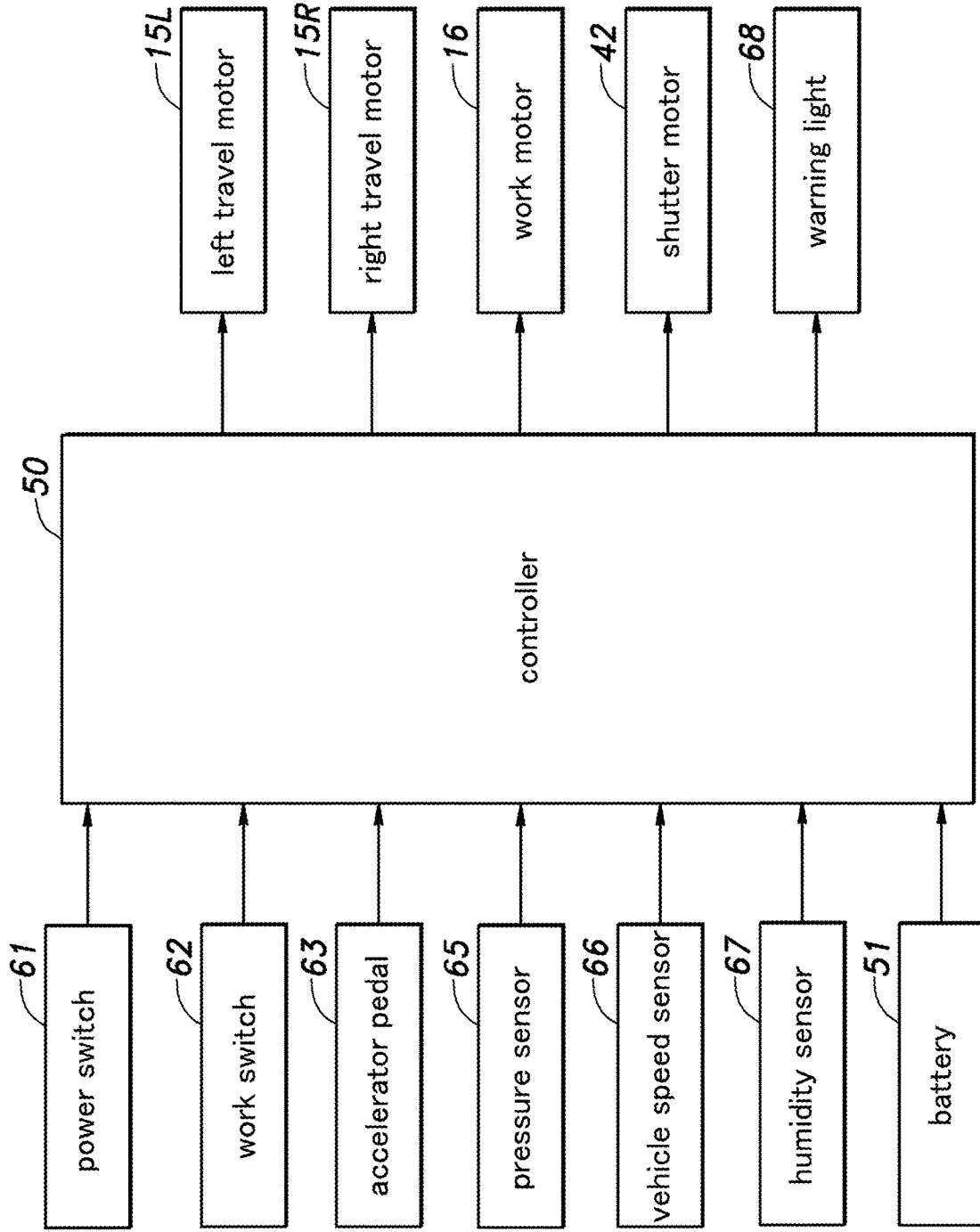
FIG. 5 is a block diagram of a control system of the lawn mower.

As shown in FIGS. 1 and 5, the vehicle body 2 is equipped with a controller 50 for controlling the left and right travel motors 15L, 15R, the work motor 16, and the shutter motor 42. The controller 50 consists of an electronic control unit (ECU) constituted of a microcomputer, ROM, RAM, peripheral circuit, input/output interface, drivers, and so on. The controller 50 is connected with a battery 51 mounted on the vehicle body 2, and is supplied with electric power from the battery 51. The controller 50 has motor drivers (not shown in the drawings) respectively corresponding to the work motor 16, the left and right travel motors 15L, 15R, and the shutter motor 42. The controller 50 supplies the electric power from the battery 51 to each motor via a corresponding motor driver to control each motor. The controller 50 controls each motor driver based on PWM control, for example, such that the electric voltage supplied to each motor is varied to control the rotational speed of each motor.

The vehicle body 2 is provided with a power switch 61, a work switch 62, and an accelerator pedal 63 as means for receiving an operation input from the operator. The power switch 61 is configured to be capable of selecting ON or OFF, and when ON is selected, the controller 50 is activated, and when OFF is selected, the controller 50 is turned off. The work switch 62 is configured to be capable of selecting ON or OFF, and outputs a signal corresponding to ON or OFF to the controller 50. The accelerator pedal 63 is a pedal to be depressed by an operator seated on the seat 11, and outputs a signal according to the pedal position to the controller 50.

The vehicle body 2 is provided with a pressure sensor 65, a vehicle speed sensor 66, and a humidity sensor 67. The pressure sensor 65 detects a pressure (atmospheric pressure) in the grass clippings transport passage 38. In the present embodiment, the pressure sensor 65 is installed in the duct 7 forming a part of the grass clippings transport passage 38, and detects the pressure in the duct 7. Namely, the pressure sensor 65 is provided in a part of the grass clippings transport passage 38 between the shutter 41 and an end of the grass clippings transport passage 38 on a side of the grass clippings receptacle 6, and detects a pressure in the grass clippings transport passage 38 downstream of the shutter 41 (hereinafter referred to as a shutter downstream pressure P). The pressure sensor 65 outputs a signal according to the shutter downstream pressure P to the controller 50, and the controller 50 obtains the shutter downstream pressure P (kPa) based on the signal from the pressure sensor 65. In this embodiment, the shutter downstream pressure P is detected as an absolute pressure.

The vehicle speed sensor 66 outputs a signal according to a travel speed V of the vehicle body 2 to the controller 50, and the controller 50 obtains the travel speed V (km/h) based on the signal from the vehicle speed sensor 66. The vehicle speed sensor 66 may be embodied as a Hall IC adapted to detect a rotational speed of a front wheel 3 or a rear wheel 4, for example.

The humidity sensor 67 is a sensor configured to detect a relative humidity of the air around the lawn mower 1, and is installed at an appropriate part of the vehicle body 2. The humidity sensor 67 outputs a signal according to the humidity H to the controller 50, and the controller 50 obtains the humidity H (%) based on the signal from the humidity sensor 67.

In addition, a notification means for notifying the operator of warning information is provided at an appropriate part of the vehicle body 2 or the steering wheel 13. The notification means may be a display unit such as an indicator or a warning light which visually notifies the operator of warning information, or a sound generator such as a buzzer or a loudspeaker which notifies the operator of warning information with sound. In the illustrated embodiment, a warning light 68 is provided to the vehicle body 2 as the notification means. The operation of the notification means is controlled by the controller 50.

The controller 50 obtains the pedal position based on the signal from the accelerator pedal 63, and determines a target rotational speed of each of the left and right travel motors 15L, 15R in accordance with the pedal position. Then, the controller 50 controls the travel motors 15L, 15R such that the rotational speed of each of the travel motors 15L, 15R coincides with its target rotational speed.

The controller 50 also controls driving of the work motor 16 based on the signal from the work switch 62. The controller 50 controls the work motor 16 to cause the work motor 16 to rotate at a predetermined rotational speed while an ON signal is being received from the work switch 62. When the work switch 62 is turned off, the controller 50 terminates the supply of electric power to the work motor 16 to stop the work motor 16.

(Shutter Opening/Closing Control)

The controller 50 controls the shutter motor 42 to open and close the shutter 41 in accordance with shutter opening/closing control shown in FIG. 6 and reciprocal opening and closing control shown in FIG. 7. The reciprocal opening and closing control is a subroutine of the shutter opening/closing control. When in operation with the power switch 61 turned on, the controller 50 conducts the shutter opening/closing control and the reciprocal opening and closing control. At the time of activation the controller 50 sets 0 as initial set values of a bagging flag F and an elapsed time t, which will be described later.

As shown in FIG. 6, in the shutter opening/closing control, the controller 50 first determines whether the work switch 62 is on (ST1). When the work switch 62 is on, the cutter blade 22 is rotating, and when the work switch 62 is off, the cutter blade 22 is stopped. If the work switch 62 is determined to be off in step ST1 (No), the controller 50 resets the elapsed time t to 0 (ST23), controls the shutter motor 42 to fully open the shutter 41 (ST25), sets the bagging flag F to 0 (ST25), turns off the warning light 68 (ST26), and proceeds to "return." Here, the bagging flag F is a flag indicating whether the lawn mower 1 is operating in the bagging mode, and is set to 1 when the lawn mower is operating in the bagging mode. On the other hand, if the lawn mower 1 is operating in the mulching mode, when the cutter blade 22 is stopped, or immediately after the cutter blade 22 starts rotating, the bagging flag F is set to 0. The elapsed time t is used to count the time from when the work switch 62 is turned on.

If the work switch 62 is determined to be on in step ST1 (Yes), the controller 50 increments the elapsed time t (ST2), and subsequently determines whether the bagging flag F is 1 (ST3). If the bagging flag F is not 1 in step ST3 (No), the controller 50 determines whether the elapsed time t is less than a predetermined transition time Tt (ST4). The transition time Tt is set to be a time period sufficient for the cutter blade 22 to reach a predetermined target rotational speed from when the cutter blade 22 starts rotating. The rotational speed of the cutter blade 22 increases until the transition time Tt has lapsed, and as the rotational speed increases, the transport air flow becomes stronger and the pressure on the downstream side of the shutter 41 increases. Preferably, the transition time Tt is set to a time period sufficient for the pressure on the downstream side of the shutter 41 to be stabilized. If the elapsed time t is determined to be less than the transition period T in step ST4 (Yes), the controller 50 controls the shutter motor 42 to fully open the shutter 41 (ST5), maintains the bagging flag F at 0 (ST6), turns the warning light 68 off (ST7), and proceeds to "return."

If the elapsed time t is determined not to be less than the transition time Tt in step ST4 (No), the controller 50 determines whether the elapsed time t is equal to the transition time Tt (ST8). If the elapsed time t is determined to be equal to the transition time Tt in step ST8 (Yes), the controller 50 determines whether the shutter downstream pressure P is greater than a predetermined pressure determination value Pth (ST9). The pressure determination value Pth is set to a value which enables detection of a state where clogging of the grass clippings transport passage 38 by the grass clippings is beginning to occur at a part of the grass clippings transport passage 38 upstream of the pressure sensor 65. When there is no clogging of the grass clippings transport passage 38, the shutter downstream pressure P is increased to be higher than the atmospheric pressure owing to the transport air flow caused by the rotation of the cutter blades 22 and the auxiliary fans 29. If the grass clippings accumulate in or adhere to a part of the grass clippings transport passage 38 upstream of the pressure sensor 65 and decrease the flow path cross-sectional area thereof, an amount of transport air flow reaching the part where the pressure sensor 65 is installed decreases, and hence, the shutter downstream pressure P decreases. Thus, the pressure determination value Pth is set to a value higher than the atmospheric pressure and lower than the shutter downstream pressure P when clogging of the grass clippings transport passage 38 by the grass clippings does not occur at all. When the shutter downstream pressure P is greater than the pressure determination value Pth, it is inferred that there is no clogging in the grass clippings transport passage 38. If the shutter downstream pressure P is determined to be greater than the predetermined pressure determination value Pth in step ST9 (Yes), the controller 50 controls the shutter motor 42 to drive the shutter 41 under reciprocal opening and closing control (ST10), sets the bagging flag F to 1 (ST11), turns the warning light 68 off (ST12), and proceeds to "return." The reciprocal opening and closing control will be described later with reference to FIG. 7.

If the shutter downstream pressure P is determined to be less than or equal to the predetermined pressure determination value Pth in step ST9 (No), the controller 50 controls the shutter motor 42 via the driver of the shutter motor 42 to fully close the shutter 41 (ST13), sets the bagging flag F to 0 (ST14), activates the warning light 68 in a first warning mode (ST15), and proceeds to "return." In the first warning mode, the warning light 68 is continuously on.

If it is determined that the bagging flag F is not 1 in step ST3 (No) and the elapsed time t is not equal to the transition time Tt in step ST8 (No), the controller 50 determines whether the shutter downstream pressure P is greater than the predetermined pressure determination value Pth (ST16). If the shutter downstream pressure P is determined to be greater than the predetermined pressure determination value Pth in step ST16 (Yes), the controller 50 controls the shutter motor 42 to drive the shutter 41 under the reciprocal opening and closing control (ST17), sets the bagging flag F to 1 (ST18), turns the warning light 68 off (ST12), and proceeds to "return."

If the shutter downstream pressure P is determined to be less than or equal to the predetermined pressure determination value Pth in step ST16 (No), the controller 50 controls the shutter motor 42 via the driver of the shutter motor 42 to fully close the shutter 41 (ST20), sets the bagging flag F to 0 (ST21), activates the warning light 68 in a second warning mode (ST22), and proceeds to "return." In the second warning mode, unlike the first warning mode, the warning light 68 is caused to flash at a predetermined interval.

In the reciprocal opening and closing control shown in FIG. 7, the controller 50 first determines whether the humidity H is lower than or equal to a predetermined humidity determination value Hth (ST31). If the humidity H is determined to be lower than or equal to the humidity determination value Hth in step ST31 (Yes), the controller 50 determines whether the travel speed V is lower than or equal to a predetermined speed determination value Vth (ST32). If the travel speed V is determined to be lower than or equal to the speed determination value Vth in step ST31 (Yes), the controller 50 controls the shutter motor 42 to cause the shutter 41 to reciprocally pivot within a first reciprocal pivoting range (opening degree: 60% to 100%) (ST33), and if the travel speed V is determined to be higher than the speed determination value Vth (No), the controller 50 controls the shutter motor 42 to cause the shutter 41 to reciprocally pivot within a second reciprocal pivoting range (opening degree: 40% to 100%) (ST34).

If the humidity H is determined to be higher than the humidity determination value Hth in step ST31 (No), the controller 50 determines whether the travel speed V is lower than or equal to the predetermined speed determination value Vth (ST35). If the travel speed V is less than or equal to the speed determination value Vth in step ST35 (Yes), the controller 50 controls the shutter motor 42 to cause the shutter 41 to reciprocally pivot within the second reciprocal pivoting range (opening degree: 40% to 100%) (ST36), and if the travel speed V is determined to be higher than the speed determination value Vth (No), the controller 50 controls the shutter motor 42 to cause the shutter 41 to reciprocally pivot within a third reciprocal pivoting range (opening degree: 20% to 100%) (ST37).

In the present embodiment, the period (sec) corresponding to one cycle of the reciprocal pivoting in each of steps ST33, ST34, ST36, and ST37 is set to the same period.

A mode of operation according to the above-described shutter opening/closing control and reciprocal opening and closing control will be described below with reference to the time chart of FIG. 8. First, upon turning on of the power switch 61 at time point T1, the controller 50 is activated, whereby the controller 50 becomes able to obtain the shutter downstream pressure P, travel speed V, and humidity H based on the signals from the pressure sensor 65, vehicle speed sensor 66, and humidity sensor 67. At time point T1, the work switch 62 is off, and therefore, the shutter opening degree is 100% (fully open) and the cutter blade 22 is not rotating. Accordingly, the shutter downstream pressure P becomes equal to the atmospheric pressure (101.3 kPa).

When the work switch 62 is turned on at time point T2, the controller 50 starts driving the work motor 16 to rotate the cutter blade 22, and the shutter downstream pressure P increases with an increase in the rotational speed of the cutter blade 22. The rotational speed of the cutter blade 22 reaches a constant speed by time point T3, which is a time point when the transition time Tt has elapsed from the time point T2, and the shutter downstream pressure P also becomes a constant value corresponding to the constant rotational speed of the cutter blade 22. During the period while the work switch 62 is off (from time point T1 to time point T2) and during the transition period from the turning on of the work switch 62 (from time point T2 to time point T3), the controller 50 does not determine whether the shutter downstream pressure P is less than or equal to the pressure determination value Pth, namely, does not conduct the control according to the shutter downstream pressure P.

At time point T3, the controller 50 determines whether the shutter downstream pressure P is less than or equal to the pressure determination value Pth, and if the shutter downstream pressure P is greater than the pressure determination value Pth, starts the reciprocal opening and closing control of the shutter, namely, starts the bagging mode. In the reciprocal opening and closing control of the shutter, the controller 50 sets the reciprocal pivoting range of the shutter 41 based on the travel speed V and the humidity H. In the present embodiment, the maximum opening degree of the reciprocal pivoting range is fixed to 100%, while the minimum opening degree is varied depending on the travel speed V and the humidity H. The minimum opening degree is made smaller for a higher value of the travel speed V and for a higher value of the humidity H. In the present embodiment, the reciprocal pivoting range is set to the first reciprocal pivoting range (opening degree: 60% to 100%) when the humidity H is lower than or equal to the humidity determination value Hth and the travel speed V is lower than or equal to the speed determination value Vth, to the second reciprocal pivoting range (opening degree: 40% to 100%) when the humidity H is lower than or equal to the humidity determination value Hth and the travel speed V is higher than the speed determination value Vth or when the humidity H is higher than the humidity determination value Hth and the travel speed V is lower than or equal to the speed determination value Vth, and to the third reciprocal pivoting range (opening degree: 20% to 100%) when the humidity H is higher than the humidity determination value Hth and the travel speed V is higher than the speed determination value Vth. At time point T3 the travel speed V is 0 and hence is lower than the speed determination value Vth, and therefore, in a case where the humidity H is lower than or equal to the humidity determination value Hth, the shutter opening degree is controlled to change as indicated by a solid line, while in a case where the humidity H is higher than the humidity determination value Hth, the shutter opening degree is controlled to change as indicated by a broken line.

At time point T4, the accelerator pedal 63 is operated, and the travel speed V of the lawn mower 1 increases. However, the travel speed V is lower than the speed determination value Vth, and therefore, the reciprocal pivoting range is not changed. At time point T5, the accelerator pedal 63 is further operated, such that the travel speed V of the lawn mower 1 increases further to such an extent that the travel speed V becomes higher than the speed determination value Vth, and this results in a change of the reciprocal pivoting range. Specifically, the reciprocal pivoting range of the shutter 41 is changed from the first reciprocal pivoting range to the second reciprocal pivoting range in the case where the humidity H is lower than or equal to the humidity determination value Hth (solid line), and from the second reciprocal pivoting range to the third reciprocal pivoting range in the case where the humidity H is higher than the humidity determination value Hth (broken line).

If grass clippings adhere to a part of the grass clippings transport passage 38 near the shutter during the bagging mode, the flow path of the grass clippings transport passage 38 is reduced, and it becomes difficult for the transport air flow to reach a downstream portion of the grass clippings transport passage 38, and this causes the shutter downstream pressure P to be reduced. The controller 50 continuously determines whether the shutter downstream pressure P is less than or equal to the pressure determination value Pth after time point T3. When the shutter downstream pressure P becomes equal to or lower than the pressure determination value Pth at time point T6, the controller 50 controls the shutter motor 42 to fully close the shutter 41, and activates the warning light 68 in the second warning mode (flashing). Thus, the operation mode of the lawn mower 1 is switched to the mulching mode. The fully closing of the shutter 41 causes further reduction in the shutter downstream pressure P. The controller 50 maintains the operation of the warning light 68 while the work switch 62 is on.

When the work switch 62 is turned off at time point T7, the controller 50 stops the work motor 16, and the rotation of the cutter blade 22 is stopped accordingly. In addition, the controller 50 terminates the operation of the warning light 68 and drives the shutter motor 42 to bring the shutter 41 to the fully open position. As the rotation of the cutter blade 22 is stopped, the shutter downstream pressure P decreases to the atmospheric pressure.

When the work switch 62 is turned on again at time point T8, the controller 50 drives the work motor 16 to start rotating the cutter blade 22 in the same manner as at time point T2, and accordingly, the shutter downstream pressure P increases with an increase in the rotational speed of the cutter blade 22. During the period from time point T8 to time point T9 at which the transition time Tt has elapsed from time point T8, the controller 50 does not determine whether the shutter downstream pressure P is less than or equal to the pressure determination value Pth.

At time point T9, the controller 50 determines whether the shutter downstream pressure P is less than or equal to the pressure determination value Pth. At time point T9, the shutter downstream pressure P is lower than the pressure determination value Pth, and accordingly, the controller 50 controls the shutter motor 42 to fully close the shutter 41, and activates the warning light 68 in the first warning mode (continuously on). Thus, the operation mode of the lawn mower 1 is switched to the mulching mode. The fully closing of the shutter 41 causes further reduction in the shutter downstream pressure P. The controller 50 maintains the operation of the warning light 68 while the work switch 62 is on.

When the work switch 62 is turned off at time point T10, the controller 50 stops the work motor 16, and the rotation of the cutter blade 22 is stopped accordingly. In addition, the controller 50 terminates the operation of the warning light 68 and drives the shutter motor 42 to bring the shutter 41 to the fully open position. As the rotation of the cutter blade 22 is stopped, the shutter downstream pressure P decreases to the atmospheric pressure.

Advantages of the lawn mower 1 configured as described above will be described below. In the lawn mower 1, because the controller 50 controls the shutter device 40 based on the shutter downstream pressure P, clogging of the grass clippings transport passage 38 is prevented before an actual occurrence thereof. During the transition time Tt from when the work switch 62 is turned on, namely, from the start of driving of the work unit 5, the controller 50 keeps the shutter 41 at the fully open position irrespective of the value of the shutter downstream pressure P, and therefore, it is possible to determine whether clogging of the grass clippings transport passage 38 is occurring without being influenced by a variation in the shutter downstream pressure P during the transition time Tt. Further, the controller 50 changes the mode of warning of the warning light 68 between immediately after the transition time Tt has elapsed from the turning on of the work switch 62 and at a later timing, whereby the operator is allowed to know whether the clogging of the grass clippings transport passage 38 began to occur before the start of the work or the clogging of the grass clippings transport passage 38 began during the work.

In addition, in the lawn mower 1, the opening degree of the shutter 41 is varied based on the travel speed V and the humidity H, and this causes the flow velocity of the transport air flow in the grass clippings transport passage 38 to change, which in turn changes the flying distance of the grass clippings. This prevents uneven distribution of the grass clippings in the grass clippings receptacle 6. Particularly, in the lawn mower 1, the shutter 41 is reciprocally pivoted in the bagging mode, and this causes the flow velocity of the transport air flow in the grass clippings transport passage 38 to vary, to thereby vary the flying distance of the grass clippings in the grass clippings receptacle 6 and prevent uneven distribution of the grass clippings in the grass clippings receptacle. The reciprocal pivoting of the shutter also helps the grass clippings that have adhered to the shutter to drop from the shutter, and thereby contributes to preventing clogging of the grass clippings transport passage at a part near the shutter.

In the lawn mower 1, the higher the travel speed V becomes, the larger the amount of grass that comes in contact with the cutter blade 22 per unit time becomes, and hence, the weight of the generated grass clippings increases. Also, an increase in the humidity H leads to an increase in water contained in the grass, which in turn results in an increase in the weight of the grass clippings. In the lawn mower 1, the higher the travel speed V becomes or the higher the humidity H becomes, the smaller the opening degree of the shutter 41 becomes, so that the flow velocity of the transport air flow in the grass clippings transport passage 38 increases. Therefore, even if the weight of the grass clippings increases, it is possible to transport the grass clippings deep inside the grass clippings receptacle 6.

In the foregoing, a concrete embodiment of the present invention has been described, but the present invention is not limited to the illustrated embodiment, and various alterations and modifications may be made. For instance, in the foregoing embodiment, one speed determination value Vth was provided, and the reciprocal pivoting ranges of the shutter 41 were set based on this speed determination value Vth, but in another embodiment, two or more speed determination values Vth may be provided to define three or more reciprocal pivoting ranges which can be selected according to the travel speed V. Similarly, two or more humidity determination values Hth may be provided to define three or more reciprocal pivoting ranges which can be selected according to the humidity H.

In the foregoing embodiment, the pressure sensor 65 was located in a part of the grass clippings transport passage 38 downstream of the shutter 41, but the pressure sensor 65 may be located between the shutter 41 and the end of the grass clippings transport passage 38 on a side of the housing 21, namely, at a part upstream of the shutter 41. In this case, if clogging occurs in a part of the grass clippings transport passage 38 near the shutter 41, the pressure in a part of the grass clippings transport passage 38 upstream of the shutter 41 increases. Therefore, the controller 50 may be configured to determine that clogging of the grass clippings transport passage 38 is beginning to occur when the pressure detected by the pressure sensor 65 becomes higher than or equal to a prescribed pressure determination value, and upon such a determination to fully close the shutter 41 and activate the warning light 68.

The present invention is not limited to riding mowers and may also be applied to walk-behind mowers.

Glossary of Terms

1: lawn mower
2: vehicle body
5: work unit
6: grass clippings receptacle
7: duct
16: work motor
21: housing
22: cutter blade
24: recess
25: connection passage
38: grass clippings transport passage
40: shutter device
41: shutter
42: shutter motor
50: controller
61: power switch
62: work switch (operation input device)
63: accelerator pedal
65: pressure sensor
66: vehicle speed sensor (speed sensor)
67: humidity sensor
68: warning lamp (notification device)

The invention claimed is:

1. A lawn mower, comprising:
a work unit including a housing having a downward-facing opening and a cutter blade rotatably provided in the housing such that when rotated, the cutter blade cuts grass and generates a transport air flow flowing from the opening of the housing to inside;
a grass clippings receptacle configured to receive mowed grass clippings;
a grass clippings transport passage connecting an interior of the housing with the grass clippings receptacle;
a shutter device including a shutter configured to open and close the grass clippings transport passage and an actuator configured to open/close-drive the shutter;
a controller configured to control the shutter device; and
a speed sensor for detecting a travel speed of the lawn mower,
wherein the controller is configured to open/close-control the shutter device based on the travel speed.

2. The lawn mower according to claim 1, wherein the controller is configured to perform a reciprocal opening and closing control to open/close-control the shutter device such that the shutter successively repeats opening and closing within a predetermined reciprocal opening degree range, the reciprocal opening degree range being varied in dependence on the travel speed.

3. The lawn mower according to claim 2, wherein the controller is configured to set a minimum opening degree of the reciprocal opening degree range such that the minimum opening degree gets smaller with an increase in the travel speed.

4. The lawn mower according to claim 3, wherein the controller is configured to set a maximum opening degree of the reciprocal opening degree range such that the maximum opening degree is fixed without regard to the travel speed.

5. The lawn mower according to claim 3, wherein the controller is configured to set the minimum opening degree of the reciprocal opening degree range to a prescribed first minimum opening degree when the travel speed is equal to or lower than a prescribed travel speed determination value, and set the minimum opening degree of the reciprocal opening degree range to a prescribed second minimum opening degree smaller than the first minimum opening degree when the travel speed is higher than the travel speed determination value.

6. The lawn mower according to claim 2, further comprising a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

7. The lawn mower according to claim 6, wherein the controller is configured to fully close the shutter in a case where the pressure is lower than or equal to the pressure determination value at a time after the transition period has elapsed.

8. The lawn mower according to claim 6, wherein the controller is configured to control the shutter device so as to position the shutter at a fully open position when the work unit is stopped.

9. The lawn mower according to claim 6, further comprising an operation input device configured to receive an operation input from an operator to operate driving and stopping of the work unit,
wherein the controller is configured to detect start and stop of driving of the work unit based on a signal from the operation input device.

10. The lawn mower according to claim 4, wherein the controller is configured to set the minimum opening degree of the reciprocal opening degree range to a prescribed first minimum opening degree when the travel speed is equal to or lower than a prescribed travel speed determination value, and set the minimum opening degree of the reciprocal opening degree range to a prescribed second minimum opening degree smaller than the first minimum opening degree when the travel speed is higher than the travel speed determination value.

11. The lawn mower according to claim 3, further comprising a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

12. The lawn mower according to claim 4, further comprising a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

13. The lawn mower according to claim 5, further comprising a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

14. The lawn mower according to claim 10, further comprising a pressure sensor provided in a part of the grass clippings transport passage located between the shutter and an end part of the grass clippings transport passage adjacent to the grass clippings receptacle, the controller being configured to start the reciprocal opening and closing control in a case where the pressure is greater than a predetermined pressure determination value at a time after a predetermined transition period has elapsed from a start of driving of the work unit.

* * * * *